Figure 1:
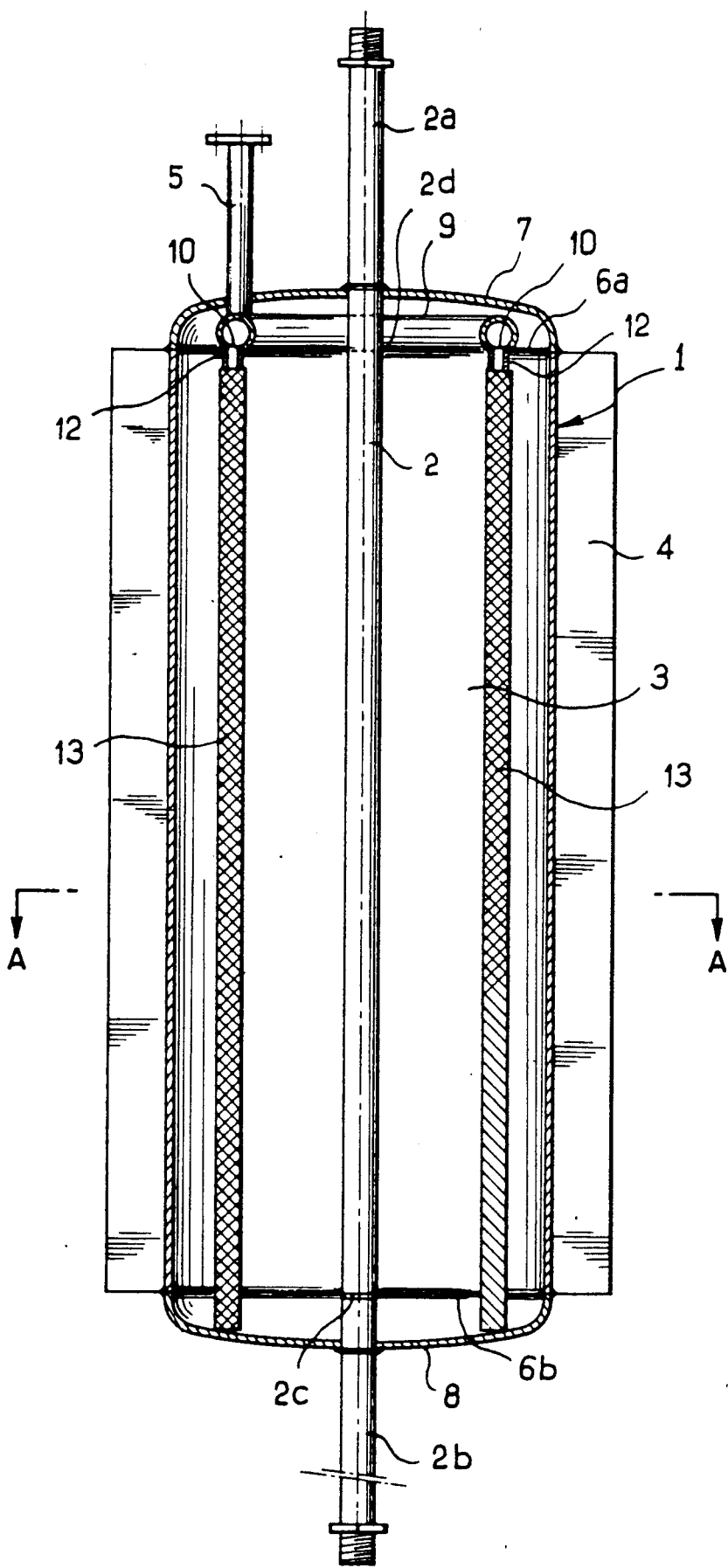

United States Patent [19]

Martin et al.

[11] Patent Number: 4,996,029
[45] Date of Patent: Feb. 26, 1991

[54] HEAT-EXCHANGER REACTOR

[75] Inventors: Frédéric Martin, Creteil; Georges Crozat, Perpignan, both of France

[73] Assignee: Faiveley Entreprises, Saint-Ouen, France

[21] Appl. No.: 314,069
[22] PCT Filed: May 20, 1988
[86] PCT No.: PCT/FR88/00257
§ 371 Date: Jan. 17, 1989
§ 102(e) Date: Jan. 17, 1989
[87] PCT Pub. No.: WO88/09469
PCT Pub. Date: Dec. 1, 1988

[30] Foreign Application Priority Data
May 22, 1987 [FR] France .................. 87 07211

[51] Int. Cl.⁵ .................. B01J 8/02; F28D 7/10
[52] U.S. Cl. .................. 422/188; 422/197; 422/200; 422/220; 165/154
[58] Field of Search .............. 422/138, 146, 173, 200, 422/201, 205, 220; 165/154, 141

[56] References Cited

U.S. PATENT DOCUMENTS

| | | |
|---|---|---|
| 1,829,370 | 10/1931 | Rohl . |
| 1,972,427 | 9/1934 | Normelli . |
| 2,019,356 | 10/1935 | Normelli . |
| 2,033,953 | 3/1936 | Prickett et al. .................. 422/220 |
| 2,181,153 | 11/1939 | Prickett .................. 422/220 |
| 2,693,026 | 11/1954 | Simpelaar .................. 165/141 |
| 2,703,921 | 3/1955 | Brown, Jr. .................. 165/141 |
| 3,197,975 | 8/1965 | Boling .................. 165/154 X |
| 3,828,566 | 8/1974 | Wetzel . |
| 4,254,081 | 3/1981 | Streczyn et al. .................. 422/46 |
| 4,372,920 | 2/1983 | Zardi .................. 422/195 X |
| 4,533,584 | 8/1985 | Takeuchi et al. .................. 422/180 X |
| 4,778,002 | 10/1988 | Allgäuer et al. .................. 165/141 |

FOREIGN PATENT DOCUMENTS

| | | |
|---|---|---|
| 640323 | 12/1936 | Fed. Rep. of Germany . |
| 754099 | 10/1933 | France . |
| 835049 | 12/1938 | France . |
| 2347640 | 11/1977 | France . |
| 2545594 | 11/1984 | France . |
| 242706 | 11/1946 | Switzerland . |
| 303408 | 2/1955 | Switzerland . |

Primary Examiner—Robert J. Warden
Assistant Examiner—Jeffrey R. Snay
Attorney, Agent, or Firm—Young & Thompson

[57] ABSTRACT

The heat-exchanger reactor comprises a cylindrical metal containment (1) intended for receiving a chemical substance, this containment (1) having passing axially through it a metal tube (2) intended for the circulation of a heat-exchange fluid. The tube (2) possesses radial fins (3) extending substantially over the entire height of the cylindrical containment (1) and over the entire radial distance between the tube (2) and the inner lateral face of the cylindrical containment (1). The invention is used particularly in devices for the generation of cold or heat by solid/gas reaction.

3 Claims, 3 Drawing Sheets

FIG_1

HEAT-EXCHANGER REACTOR

The present invention relates to a heat-exchanger reactor which can be used especially for obtaining synthesis or decomposition reactions between a solid and a gas.

Many systems incorporating reactors are used in the chemical industry. These systems are designed to allow the above-mentioned synthesis or decomposition reactions as efficiently as possible, without too much concern about the quantities of heat utilized during these reactions.

In some uses, particularly those where the reactors form part of an installation for the generation of cold or heat, it is expedient to have the possibility of recovering the quantities of heat utilized and even of ensuring that they are the best possible, and this involves controlling the quantity of heat exchanged on the one hand and the energy level, that is to say the temperature, on the other hand. For this purpose, the technology of the reactor must be such that the chemical reactions take place correctly and the heat exchanges can be controlled in terms of both quantity and level.

Thus, in a reactor satisfying the above-mentioned conditions, there must be the possibility of introducing into the containment of the reactor enclosing the reactive material a heat-exchange fluid providing this material with the quantity of heat necessary to allow the reaction, and there must also be the possibility of dissipating the reaction heat by means of another fluid.

The object of the present invention is to provide a heat-exchanger reactor which is of simple structure and easy to produce and which makes it possible to achieve the above-mentioned objectives.

The invention is concerned with an exchanger reactor comprising a cylindrical metal containment intended for receiving a chemical substance, this containment having passing axially through it a metal tube intended for the circulation of a heat-exchange fluid, means being provided to allow a heat exchange between the tube and the interior of the cylindrical containment.

According to the invention, this heat-exchanger reactor is defined in that the tube possesses radial fins extending substantially over the entire height of the cylindrical containment and over the entire radial distance between the tube and the inner lateral face of the cylindrical containment, in that the outer lateral face of the cylindrical containment possesses radial fins, and in that the assembly composed of the cylindrical containment and of the tube possessing fins is in one piece.

The radial fins of the tube in which a heat-exchange fluid circulates thus divide the interior of the cylindrical containment into a series of compartments containing a reactive chemical substance.

The heat-exchange fluid circulating in the tube exchanges its heat with the chemical substance by means of the fins of this tube. Because of the radial arrangement of these fins and their distribution within the chemical substance, they provide the best possible heat-exchange surface between the heat-exchange fluid and this chemical substance.

Because the outer lateral face of the cylindrical containment possesses radial fins, it becomes possible to dissipate outwards the heat of the exothermic synthesis reaction between the chemical substance and a fluid conveyed into the reactor, when the latter is used in a system which involves synthesis and decomposition reactions alternating in time, as described, for example, in the Applicant's French Patent Application No. 8,707,210 of 22nd May 1987 entitled "Process for generating cold by solid/gas reaction and apparatus relating thereto".

Furthermore, because the assembly composed of the cylindrical containment and of the tube possessing the fins is in one piece and can, for example, be produced by extrusion, it becomes possible to obtain a both efficient and inexpensive reactor by means of a single production operation. The section obtained by extrusion can be cut into elements of variable length according to the desired capacity of the reactors to be obtained.

Other particular features and advantages of the invention will also emerge from the following description.

Figure 2:
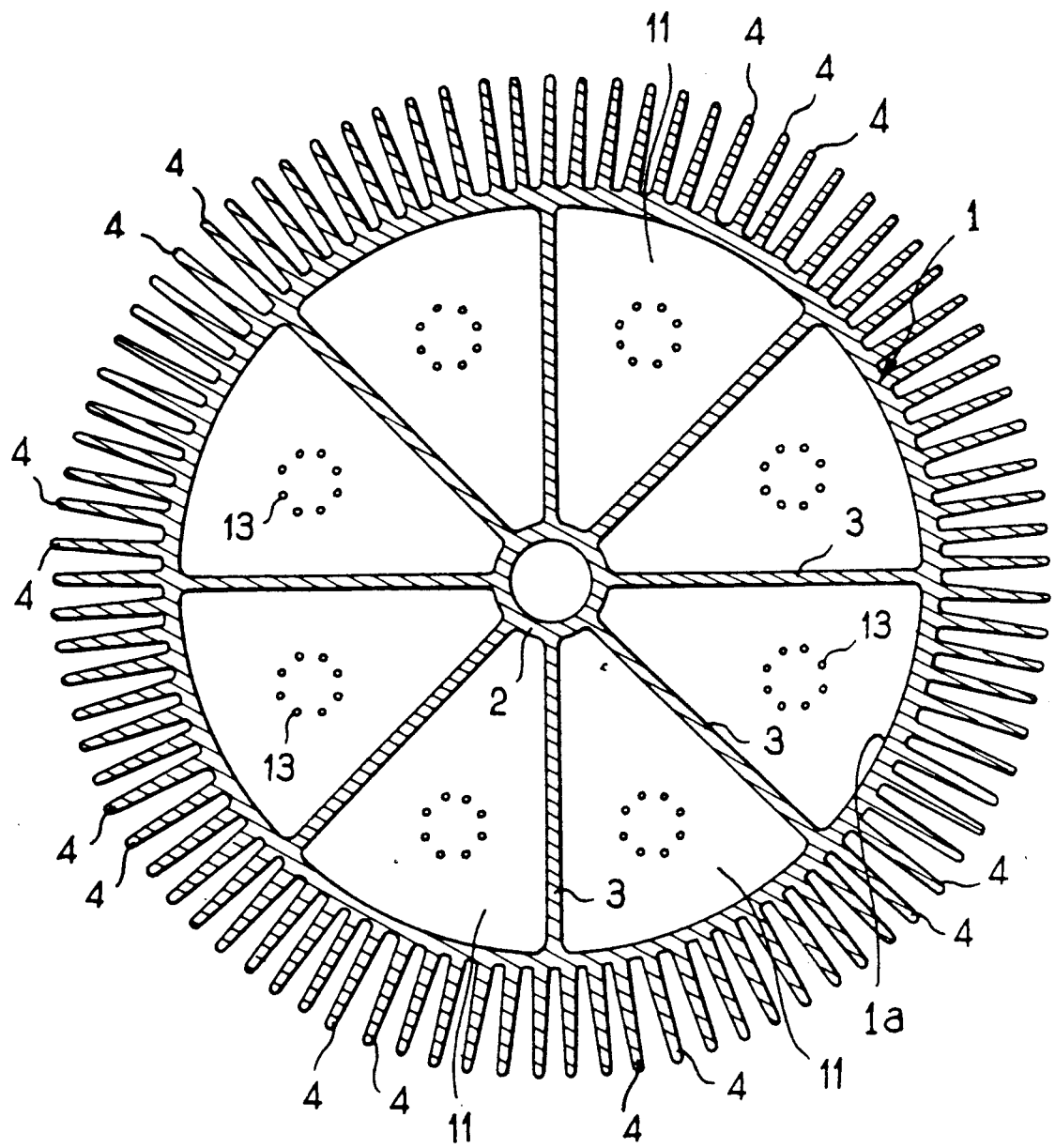
Figure 3:
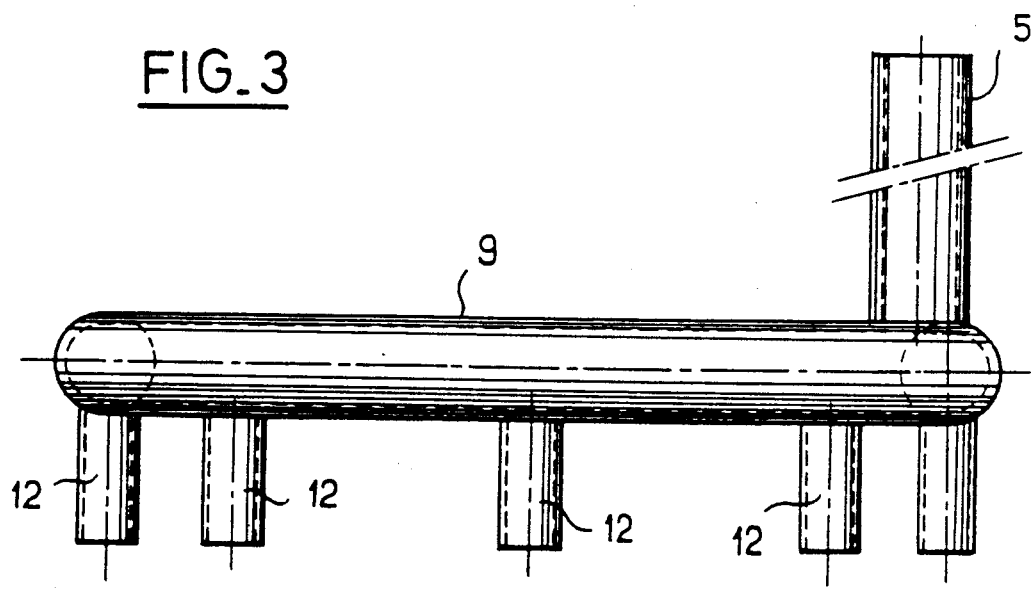
Figure 4:
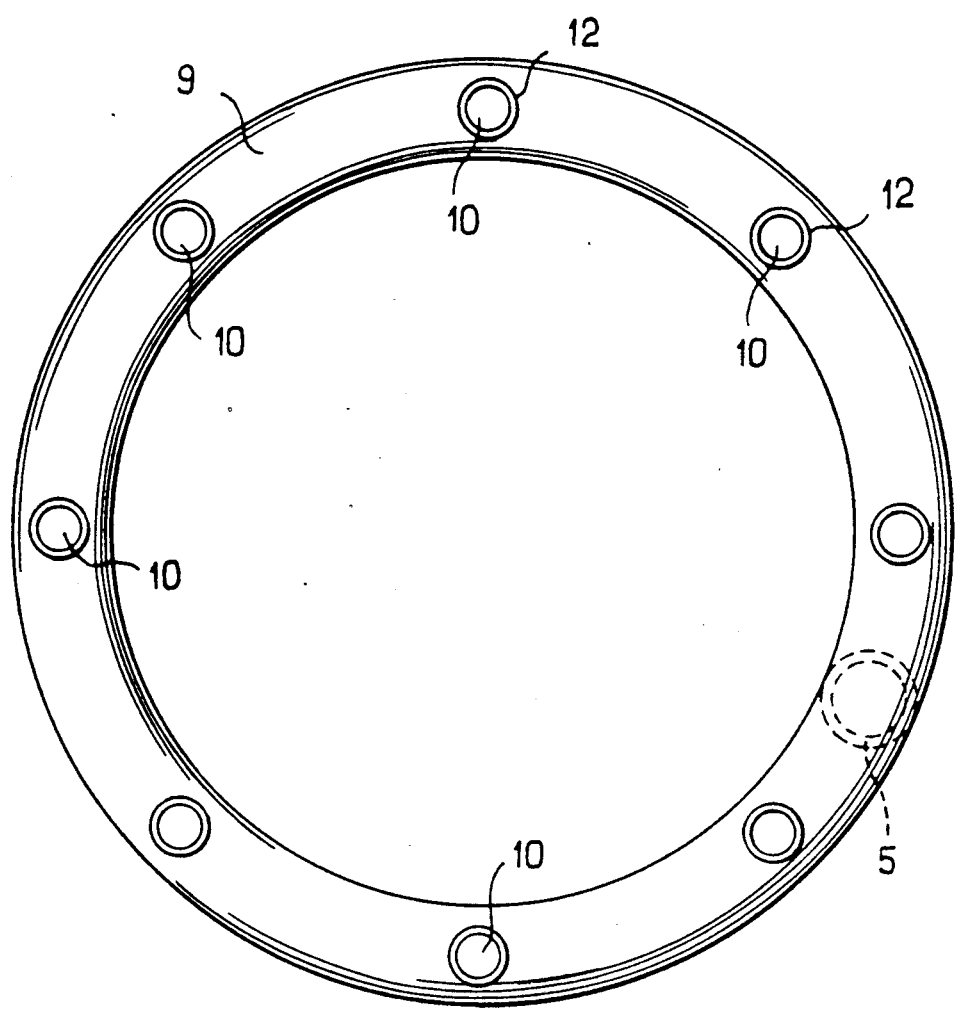

In the accompanying drawings given by way of non-limiting examples:

FIG. 1 is a view in longitudinal section of an exchanger reactor according to the invention, FIG. 2 is a sectional view along the line A—A of FIG. 1, FIG. 3 is an elevation view of the toroidal hollow body for collecting and distributing the reactive fluid, FIG. 4 is a plan view of the abovementioned toroidal hollow body.

In the embodiment of FIGS. 1 and 2, the heat-exchanger reactor essentially comprises a cylindrical metal containment 1 intended for receiving a chemical substance, this containment having passing axially through it a metal tube 2 intended for the circulation of a heat-exchange fluid.

According to the invention, the tube 2 possesses (see FIG. 2) radial fins 3 extending substantially over the entire height of the cylindrical containment 1 and over the entire radial distance between the tube 2 and the inner lateral face 1a of the cylindrical containment 1.

FIG. 2 shows, on the other hand, that the outer lateral face of the cylindrical containment 1 possesses radial fins 4 which make it possible to dissipate the heat from the interior of this containment outwards, as will be seen in more detail later.

The assembly composed of the cylindrical containment 1 and of the tube 2 possessing fins 3 is in one piece and is produced by extrusion.

The assembly composed of the cylindrical containment and of the tube 2 with fins 3 is preferably made of aluminum or an aluminum-based alloy. These are suitable for extrusion and have ideal thermal conductivity.

The above reactor is intended for containing a solid chemical substance, such as a metal chloride, capable of reacting with a fluid, such as ammonia.

For this purpose, the cylindrical containment 1 possesses a pipeline 5 making it possible to convey the fluid into the containment.

In the embodiment illustrated, the opposite ends 6a, 6b of the cylindrical containment 1 are closed by means of flanges 7, 8 welded to the said ends. Between one 7 of the end flanges of the cylindrical containment 1 and the adjacent end of the fins 3 of the tube 2 is arranged a toroidal hollow body 9 centered on the axis of the tube 2. The pipeline 5 for delivering the fluid opens into this hollow body 9, and the latter possesses a series of orifices 10 (see also FIGS. 3 and 4) uniformly distributed round the tube 2 and arranged facing each of the compartments 11 delimited by the fins 3 of the tube 2.

The orifices 10 in the hollow body 9 are equipped with tubular elements 12 which are themselves extended by tubular elements 13 (see FIG. 1) permeable to the fluid and extending as far as that end of the cylindrical containment 1 opposite the hollow body 9.

In the example illustrated, the tubular elements 13 are composed of sleeves made of metal netting, the meshes of this being sufficiently close to prevent the solid product from passing into the sleeves. The tube 2 with fins 3 and the fluid delivery pipeline 5 are welded to the end flanges 7 and 8. The tube 2 with fins 3 is extended at the outside of the cylindrical containment 1 by two tube elements 2a, 2b which are welded to the central tube 2 at 2c, 2d, that is to say level with the ends 6a, 6b of the fins 3 located inside the containment 1.

The reactor just described functions as follows.

A heat-exchange fluid, such as a thermal oil, is made to circulate inside the tube 2 by means of an external pump (not shown).

Air is made to circulate, for example by means of an external motor fan, towards the fins 4 located on the outer face of the containment 1.

A fluid, such as a gas, capable of reacting physically or chemically with a solid chemical substance contained inside the containment 1 is introduced via the pipeline 5.

The heat-exchange fluid circulating in the tube 2 with fins 3 makes it possible to heat the solid contained in the containment 1 thoroughly and thus cause decomposition of the compound obtained by reaction between the solid and the gas introduced via the pipeline 5. The gas thereby formed escapes from the containment 1 via the pipeline 5.

In a second operating step, the circulation of the heat-exchange fluid in the finned tube 2 is stopped. Instead, the air is blown against the outer fins 4 of the containment, thus making it possible to eliminate the heat generated during the synthesis reaction between the solid and the gas inside the containment 1.

Of course, the invention is not limited to the exemplary embodiment just described, and many modifications can be made to this, without departing from the scope of the invention.

Thus, the end flanges 7 and 8 could be screwed to the ends of the containment 1.

Moreover, the tube 2 with fins 3 could be separate from the cylindrical containment 1 and be mounted removably in this.

The toroidal hollow body 9 could be replaced by a plate having orifices, such as the orifices 10, and be fastened under the flange 7 level with the end 6a of the fins 3 of the tube 2.

We claim:

1. A heat-exchanger reactor comprising a cylindrical metal containment for receiving a solid chemical substance, this containment having passing axially through it a metal tube for the circulation of a heat-exchange fluid, the tube and an interior of the cylindrical containment being in heat exchange relation with each other, wherein the tube has first radial fins each extending substantially over the entire height of the cylindrical containment and extending over the entire radial distance between the tube and an inner surface of the cylindrical containment, an outer surface of the cylindrical containment having second radial fins each extending substantially over the entire height of said cylindrical containment, and the assembly composed of the cylindrical containment including said first radial fins and the tube including said second fins being a one-piece unit, opposite ends of the cylindrical containment being each closed by an end flange welded to said ends, and between one of said end flanges of the cylindrical containment and an adjacent end of said first radial fins of the tube there being a toroidal hollow body centered on an axis of the tube, a fluid delivery pipeline opening into said hollow body, and said hollow body having a series of orifices uniformly distributed around the tube and each arranged opposite a respective one of compartments delimited by the first radial fins of the tube.

2. A reactor as claimed in claim 1, wherein the orifices in the hollow body are extended by tubular elements permeable to the fluid and extending as far as an end of the cylindrical containment remote from said hollow body.

3. A reactor as claimed in claim 2, wherein the tubular elements are composed of sleeves made of metal netting, the meshes of this being sufficiently close to prevent said solid chemical substance from passing into the sleeves.

* * * * *